US011190018B2

United States Patent
Bacon

(10) Patent No.: US 11,190,018 B2
(45) Date of Patent: Nov. 30, 2021

(54) ULTRA-LOW NOISE MAINS DC POWER SUPPLY

(71) Applicant: Tom Alexander Paston Bacon, Warwick (GB)

(72) Inventor: Tom Alexander Paston Bacon, Warwick (GB)

(73) Assignee: Quest Electronics Limited, Warwick (GB)

( * ) Notice: Subject to any disclaimer, the term of this patent is extended or adjusted under 35 U.S.C. 154(b) by 84 days.

(21) Appl. No.: 16/428,718

(22) Filed: May 31, 2019

(65) Prior Publication Data

US 2019/0379206 A1    Dec. 12, 2019

(30) Foreign Application Priority Data

Jun. 7, 2018  (GB) .................................... 1809357

(51) Int. Cl.
| | | |
|---|---|---|
| *H02J 3/32* | (2006.01) | |
| *H02M 7/00* | (2006.01) | |
| *H02M 7/06* | (2006.01) | |

(52) U.S. Cl.
CPC ................ *H02J 3/32* (2013.01); *H02M 7/06* (2013.01)

(58) Field of Classification Search
CPC ...................................................... H02J 1/06
See application file for complete search history.

(56) References Cited

U.S. PATENT DOCUMENTS

| | | | | |
|---|---|---|---|---|
| 3,805,157 A | * | 4/1974 | Acks .................... | G01R 21/133 324/141 |
| 4,153,922 A | * | 5/1979 | Azuma .................... | H01H 9/56 361/3 |
| 5,237,140 A | * | 8/1993 | Akazawa ................ | H01F 38/08 219/716 |
| 6,472,880 B1 | * | 10/2002 | Kang .................... | G01R 31/396 324/434 |
| 6,822,882 B1 | * | 11/2004 | Jacobs ................ | H03K 17/163 363/21.06 |
| 2012/0081167 A1 | * | 4/2012 | Ban ........................ | H02J 7/0021 327/333 |
| 2014/0205865 A1 | * | 7/2014 | Matsuo ................ | G01R 31/396 429/7 |
| 2016/0065086 A1 | * | 3/2016 | Zojer .................... | H02M 7/217 363/127 |
| 2016/0190832 A1 | * | 6/2016 | Sugimura ............ | G01R 31/396 320/116 |
| 2017/0184676 A1 | * | 6/2017 | Shimizu ............... | G01R 31/396 |
| 2018/0309372 A1 | * | 10/2018 | Leong ............... | H02M 3/33576 |

* cited by examiner

*Primary Examiner* — Daniel Kessie
*Assistant Examiner* — Terrence R Willoughby

(57) ABSTRACT

A mains DC power supply comprising a buffer amplifier, in which a battery is used to provide a reference voltage for the buffer amplifier. The battery voltage reference is disconnected from the buffer amplifier, to prevent excessive dissipation of the battery, when the mains AC supply is in the switched-off state. The use of a battery voltage reference produces a DC power supply, from the mains AC supply, with an ultra-low level of subsonic and audio frequency noise.

1 Claim, 2 Drawing Sheets

ULTRA-LOW NOISE MAINS DC POWER SUPPLY

RELATED APPLICATIONS

GB 1809357.5

BACKGROUND

In the field of electronics, there is a need to generate a DC power supply with a minimum amount of noise present. This is particularly important when the electrical signal under consideration is at a very low voltage level. It is desirable to derive this minimum noise DC power supply from the mains power supply since batteries suitable to deliver the required power, for a sufficient time period, are typically expensive, heavy and bulky. Rechargeable batteries also deteriorate over time due to the cyclic charging and discharging process.

BRIEF SUMMARY

This invention relates to the design of an ultra-low noise DC power supply derived from the mains AC power supply.

DETAILED DESCRIPTION

DC voltages are typically generated from the mains AC power supply using the linear or switching methods. Both methods typically produce DC with a significant amount of broadband noise and mains frequency related ripple voltage, when under loaded conditions. In order to create an ultra-low noise DC supply, under loaded conditions, a further filter circuit or the use of a low noise voltage reference and buffer amplifier is required. Filtering can be achieved both actively (with a following buffer amplifier) or passively (without a following buffer amplifier). Utilising a voltage reference requires a following buffer amplifier. Making use of a buffer amplifier typically gives lower output impedance compared with a passive filter. This is due to the output impedance of the buffer amplifier being lower than the output impedance of the passive filter components. Possible, typical, prior-art filters or voltage references, for use with a following buffer amplifier, are:

RC filter
LC filter/π-filter
Zener diode
RC filtered zener diode
Band gap voltage reference This invention replaces the prior-art voltage references or filters, listed above, with a battery voltage reference. The DC power supply of this invention is a combination of battery and mains power supplies. The battery voltage reference provides a stable, ultra-low noise voltage to the buffer amplifier. Only a small current is drawn from the battery voltage reference, resulting in a long battery life. For a split-rail (dual positive and negative) DC power supply, two battery voltage references are required. This invention also claims a means of disconnecting, and connecting, the battery voltage reference(s) from the circuit to avoid battery dissipation when the mains power supply is switched off. The battery voltage reference connection to the buffer amplifier is controlled or set by the position of the mains power switch. This invention can apply to all types of mains DC power supply (for example for the linear or switching methods). This invention provides a measurably lower noise floor level than the prior-art techniques, particularly at subsonic and audio frequencies. When this invention is compared with the zener diode voltage reference, an approximate 6 dB reduction in the noise floor, at 20 Hz, is observed. An even greater reduction in the level of the noise floor occurs at sub-sonic frequencies. At 1 Hz, for example, the noise floor is lowered by approximately 10 dB. The power supply of this invention gives the noise floor performance of a battery supply without making use of expensive, heavy, bulky batteries.

The invention will now be described solely by way of example and with reference to the accompanying drawings in which.

Figure 1:
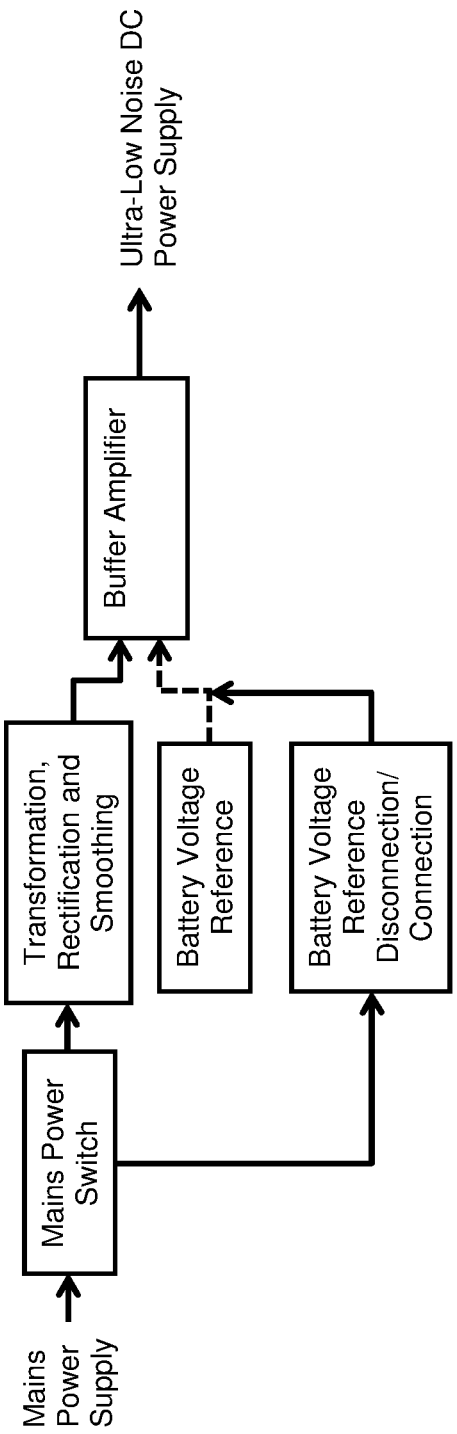
FIG. 1 shows the overall embodiment of the invention including battery voltage reference and battery voltage reference supply disconnection/connection.

FIG. 1 is a block diagram showing the overall embodiment of the invention, based upon a conventional linear power supply. FIG. 1 indicates where the battery voltage reference and battery supply disconnection/connection function blocks are located within the overall structure of the ultra-low noise DC mains power supply. The battery voltage reference provides a stable, ultra-low noise DC voltage to the buffer amplifier. The battery supply disconnection/connection is located between the battery voltage reference and the buffer amplifier. The battery voltage reference disconnection/connection to the buffer amplifier is controlled or set by the on-off position of the mains power supply switch.

Figure 2:
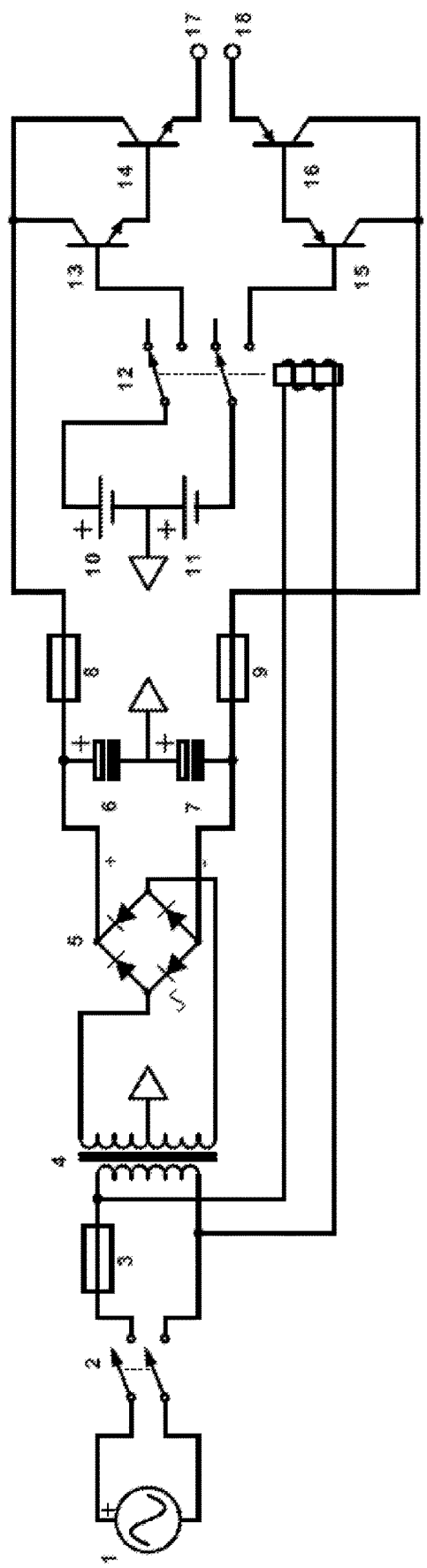
FIG. 2 shows a detailed, implementation level, possible embodiment of the invention.

FIG. 2 shows a possible implementation of this invention with a split-rail (dual positive and negative), linear power supply. When mains power switch 2 is in the "on" position, mains input voltage 1 is applied to fuse 3 and the step-down, centre-tapped mains transformer 4. Full-wave bridge rectifier 5 rectifies the AC voltage from mains transformer 4, into a rudimentary DC voltage. Smoothing capacitors 6 and 7 smooth the waveform to produce a DC voltage, but still with a significant degree of ripple voltage present. 8 and 9 are safety protective fuses. The battery voltage references 10 and 11 set the base voltages for the buffer amplifiers formed by 13, 14, 15 and 16. When the mains power switch 2 is set to the "on" position, the coil of relay 12 is energised by mains input voltage 1. This switches voltage references 10 and 11 to their respective buffer amplifiers 13/14 and 15/16. When the mains power switch 2 is set to the "off" position, the coil of relay 12 is not energised by the mains input voltage 1. This disconnects voltage references 10 and 11 from their respective buffer amplifiers 13/14 and 15/16. Battery voltage reference 10 supplies buffer amplifier 13/14. Battery voltage reference 11 supplies buffer amplifier 15/16. Node 17 is the positive DC output voltage point, relative to ground. Node 18 is the negative DC output voltage point, relative to ground. This invention utilises battery voltage references 10 and 11 as well as battery voltage reference disconnection/connection relay 12 to provide an ultra-low noise split-rail DC power supply from the AC mains supply.

The invention claimed is:
1. A circuit for supplying DC power to a load, the circuit comprising:
 a rectifier for converting an AC supply voltage from the mains to a DC voltage;
 a battery, consisting of a single cell or multiple cells;
 a switching element;
 a smoothing capacitor;
 a relay;
 a transformer;

a buffer amplifier, for providing the DC power to the load, wherein the battery is used to provide a reference voltage for the buffer amplifier;

wherein the transformer, for scaling up or down the AC supply voltage, is coupled between the rectifier and the mains;

wherein the smoothing capacitor is coupled to the buffer amplifier;

wherein the relay is coupled to a primary side of the transformer; and wherein the switching element disconnects the battery from the buffer amplifier when the AC power supply is in a switched-off state.

\* \* \* \* \*